Patented Dec. 12, 1939

2,183,240

UNITED STATES PATENT OFFICE 2,183,240

MANUFACTURING VINYL HALIDES

Karl Jung, Rheinfelden in Baden, Germany, assignor to I. G. Farbenindustrie Aktiengesellschaft, Frankfort-on-the-Main, Germany No Drawing. Application May 25, 1938, Serial No. 209,984. In Germany May 28, 1937

8 Claims. (Cl. 260—656)

The present invention relates to an improved process for manufacturing vinyl halides.

It has been shown, for instance, in British Patent No. 21,134 of 1913 that the product of addition of hydrogen halide to acetylene may be obtained by allowing the gases to bubble through a solution of a catalyst which is preferably maintained at a temperature some degrees below the boiling point of the solvent. When this process is applied on a large scale there are considerable disadvantages. If, for example, a mercury salt is used as the catalyst it volatilizes with the vapor of the solvent and there is very soon a diminution of the active catalyst so that finally the reaction comes to rest. A further disadvantage is that the mercury salt suffers reduction to metallic mercury.

Now, I have found that the said disadvantages may be avoided so that the reaction between acetylene and hydrogen halide with the use of a mercury salt as a catalyst may be carried out as a permanent operation when using an anhydrous liquid carrier for the catalyst which on the one hand is a sufficiently good solvent for the mercury salt and on the other hand is also capable of dissolving alkali halides or the double salts which they form with mercury compounds, for instance, $HgCl_2.2NaCl$, $HgCl_2.2KCl$. Suitable organic solvents of this kind are the aliphatic glycols of low molecular weight and their halohydrins. These may be kept anhydrous and permit the operation to proceed at the necessary high temperature.

It has further been found that the activity of the catalyst may be essentially prolonged if there is added to a solution containing the catalyst a salt of such a heavy metal which forms several stages of oxidation, preferably a cerium salt, and if care is taken that the hydrogen halide contains a small proportion of free halogen.

The following example illustrates the invention:

In 1000 parts by weight of anhydrous glycol there are dissolved about 40 to 50 parts of mercuric chloride, 25 parts of potassium chloride and 1 part of anhydrous cerium chloride. This solution is saturated with dry hydrogen chloride and there is passed through the solution, which may be circulated in a tower, at a raised temperature of about 90° to about 100° C. and in countercurrent to the catalyst dry acetylene and dry halogen chloride in the proportion by volume of 4:5. The gases produced then contain 85 to 90 per cent. by volume of vinyl chloride. During the operation there may be added to the hydrogen chloride introduced about 0.1 per cent. by volume of chlorine. The reaction may be conducted as a continuous process without degradation of the catalytic action.

Obviously, my invention is not limited to the foregoing example or to the specific details given therein. Thus, for instance, instead of glycol methyl-, di-methyl- or ethylglycol, glycerine, glycerine-α-chlorohydrin or similar compounds of this series may be used as a solvent. The mercuric chloride-potassium chloride double salt may be substituted by either mercuric chloride alone or by the double salt formed with an earth alkali halogenide.

What I claim is:

1. In a process for manufacturing a vinyl halide by the addition of hydrogen halide to acetylene in the presence of a mercuric halide, the step which comprises reacting the said components in the presence of an organic solvent of low molecular weight of the group consisting of polyhydric aliphatic alcohols and the halohydrins thereof, in which the mercuric halide is dissolved.

2. In a process for manufacturing a vinyl halide by the addition of hydrogen halide to acetlylene in the presence of a mercury compound, the step which comprises reacting the said components in the presence of an organic solvent of low molecular weight of the group consisting of polyhydric aliphatic alcohols and the halohydrins thereof, in which a mercuric compound of the group consisting of a double salt of mercuric halide with an alkali halide and an alkaline earth halide is dissolved.

3. In a process for manufacturing a vinyl halide by the addition of hydrogen halide to acetylene in the presence of a mercuric halide, the step which comprises reacting the said components in the presence of an organic solvent of low molecular weight of the group consisting of polyhydric aliphatic alcohols and the halohydrins thereof, in which the mercuric halide is dissolved, and of a salt of a heavy metal capable of more than one stage of oxidation.

4. In a process for manufacturing a vinyl halide by the addition of hydrogen halide to acetylene in the presence of a mercuric halide, the step which comprises reacting the said components in the presence of an organic solvent of low molecular weight of the group consisting of polyhydric aliphatic alcohols and the halohydrins thereof, in which the mercuric halide is dissolved, and of cerium chloride.

5. In a process for manufacturing a vinyl halide by the addition of hydrogen halide to acetylene in the presence of a mercury compound, the step which comprises reacting the said components in the presence of an organic solvent of low molecular weight of the group consisting of polyhydric aliphatic alcohols and the halohydrins thereof, in which a mercuric compound of the group consisting of a double salt of mercuric halide with an alkali halide and an alkaline earth halide is dissolved, and of cerium chloride.

6. In a process for manufacturing a vinyl halide by the addition of hydrogen halide to acetylene in the presence of a mercuric halide, the step which comprises reacting the said components in the presence of an organic solvent of low molecular weight of the group consisting of polyhydric aliphatic alcohols and the halohydrins thereof, in which the mercuric halide is dissolved, and of cerium chloride, the hydrogen chloride containing minimal amounts of free chlorine.

7. In a process for manufacturing a vinyl halide by the addition of hydrogen halide to acetylene in the presence of a mercury compound, the step which comprises reacting the said components in the presence of an organic solvent of low molecular weight of the group consisting of polyhydric aliphatic alcohols and the halohydrins thereof, in which a mercuric compound of the group consisting of a double salt of mercuric halide with an alkali halide and an alkaline earth halide is dissolved, and of cerium chloride, the hydrogen chloride containing minimal amounts of free chlorine.

8. The process which comprises dissolving about 40 to about 50 parts of mercuric chloride, 25 parts of potassium chloride and 1 part of anhydrous cerium chloride in 1000 parts of glycol, saturating the solution with dry hydrogen chloride, and contacting it with a gas mixture comprising dry acetylene and hydrogen chloride in the proportion by volume of 4:5.

KARL JUNG.